United States Patent [19]
Yoon

[11] Patent Number: 5,255,140
[45] Date of Patent: Oct. 19, 1993

[54] VCR MAGNETIC RECORDING HEAD FOR BOTH DIGITAL AND VHS FORMAT

[75] Inventor: Jong-Kyoung Yoon, Suwon, Rep. of Korea

[73] Assignee: SamSung Electronics Co., Ltd., Suwon, Rep. of Korea

[21] Appl. No.: 635,869

[22] Filed: Dec. 28, 1990

[30] Foreign Application Priority Data

Dec. 29, 1990 [KR] Rep. of Korea ............... 1989-10073

[51] Int. Cl.$^5$ .................. G11B 21/24; G11B 21/02; G11B 5/53
[52] U.S. Cl. .................. 360/109; 360/10.3; 360/75; 360/77.16
[58] Field of Search .............. 360/10.3, 19.1, 32, 360/64, 75, 77.13, 77.16, 85, 109

[56] References Cited

U.S. PATENT DOCUMENTS

| | | | |
|---|---|---|---|
| 4,581,662 | 4/1986 | Sato | 360/77.16 |
| 4,590,523 | 5/1986 | Honjo et al. | 360/10.3 |
| 4,791,507 | 12/1988 | Doyana et al. | 360/10.2 |
| 4,924,325 | 5/1990 | Tamashita | 360/77.16 |
| 4,974,111 | 11/1990 | Platte et al. | 360/14.1 |
| 5,045,954 | 9/1991 | Oishi et al. | 360/77.13 |
| 5,051,846 | 9/1991 | Tsushima et al. | 360/19.1 |
| 5,057,949 | 10/1991 | Suga et al. | 360/77.16 |

*Primary Examiner*—Robert S. Tupper
*Assistant Examiner*—Jefferson Evans
*Attorney, Agent, or Firm*—Robert E. Bushnell

[57] ABSTRACT

A double azimuth four-head drum may be made to be jointly usable in a digital VCR and VHS-VCR. A piezoelement is respectively installed between the head drum and the first standard play channel head and the first extended play channel head, and a switch is coupled to the piezoelement to apply a control voltage thereto.

19 Claims, 2 Drawing Sheets

VCR MAGNETIC RECORDING HEAD FOR BOTH DIGITAL AND VHS FORMAT

BACKGROUND OF THE INVENTION

The present invention relates to a magnetic head for a digital video cassette tape recorder (VCR), and more particularly to a video magnetic head being jointly usable in a VHS-VCR and a digital VCR, by using a double azimuth four head drum for VHS-VCR to record two tracks when the head drum rotates every 180 degrees.

Generally, as shown in FIG. 1, the double azimuth four head drum is manufactured such that a first standard play channel head (hereinafter, referred to as SP1) 10 and a second extended play channel head (hereinafter, referred to as EP2) 20 are mounted in a pair on the surface of a head drum base 1, and a first extended play channel head (hereinafter, referred to as EP1) 30 and a second standard play channel head (hereinafter, referred to as SP2) 40 are mounted in a pair on the surface of head drum base 1 opposite the pair 10, 20. Since the heads having the structure as illustrated in FIG. 1 are attached on the surface of the head drum base 1, the positions of the heads are fixed, thus rising a drawback that necessarily requires a use of digital VCR head and a rotary transformer so as to record and reproduce the digital video signals.

SUMMARY OF THE INVENTION

Accordingly, it is an object of the present invention to provide a double azimuth four-head drum which may be jointly used for a VHS-VCR and a digital VCR to record and reproduce digital signals. Between the head drum and a first standard play channel head and a first extended play channel head which are mounted thereon, is respectively installed a piezoelement. And, switch is coupled to the piezoelement in order to selectively apply voltage thereto.

BRIEF DESCRIPTION OF THE DRAWINGS

For a better understanding of the invention and to show how the same may be carried into effect, reference will now be made, by way of example, to the accompanying diagrammatic drawings, in which.

DESCRIPTION OF THE PREFERRED EMBODIMENTS

Figure 1:
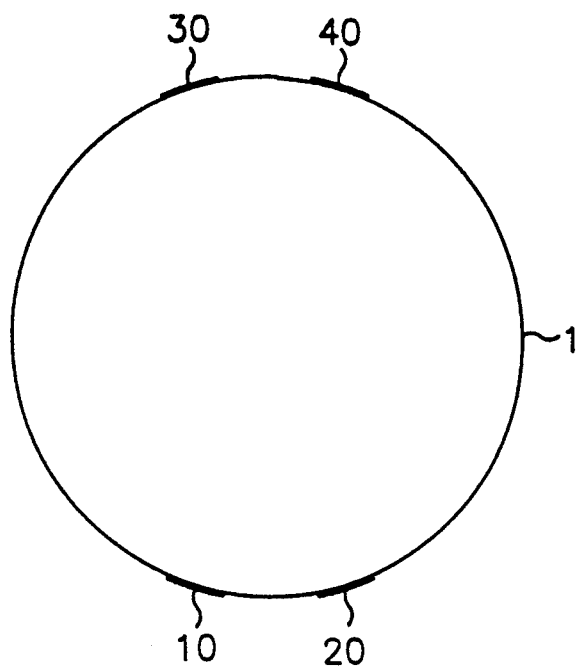
FIG. 1 is a view of head positions according to a conventional VCR head drum.
Figure 2:
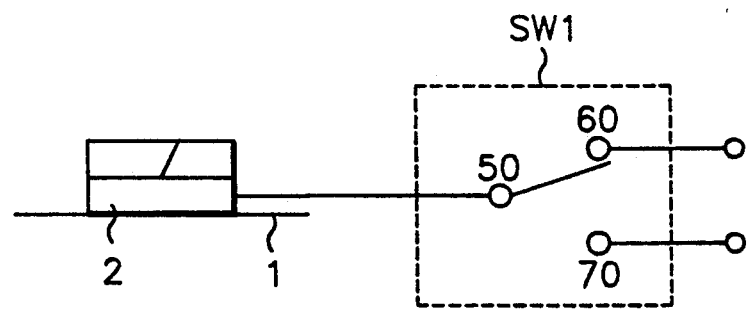
FIG. 2 is a partially magnified cross sectional view of a head according to the present invention.

Referring to FIG. 2, the structure of an EP1 head 30 and SP1 head are described in detail, in which a piezoelement 2 is mounted on a head drum base 1. The piezoelement 2 is coupled to a terminal 50 of a switch SW1. The switch SW1 is normally put in a condition that the terminal 50 is switched to a terminal 60 in order to provide the piezoelement 2 with a voltage input while a terminal 70 is disconnected from the terminal 50.

Figure 3:
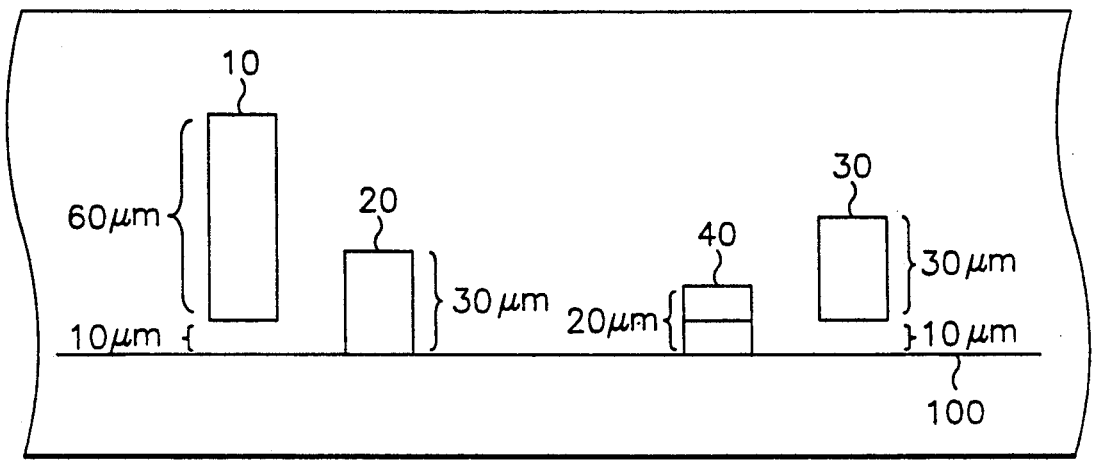
FIG. 3 is a plan view of head positions while serving for a digital VCR according to the present invention.

Referring to FIG. 3, a reference level 100 of the heads is represented on the surface of the head drum base 1. The SP1 head 10 with a track width of 60 $\mu$m is mounted 10 $\mu$m above the reference level 100. An EP2 head 20 with a track width of 30 $\mu$m is mounted on the reference level 100, the EP2 head 20 making a pair with the SP1 head 10. In similar manner, the SP2 head 40 with a track width of 20 $\mu$m is mounted on the reference level 100 and the EP1 head 30 is mounted 10 $\mu$m above the reference level 100, the EP1 head 30 making another pair with the SP2 head 40.

Figure 4:
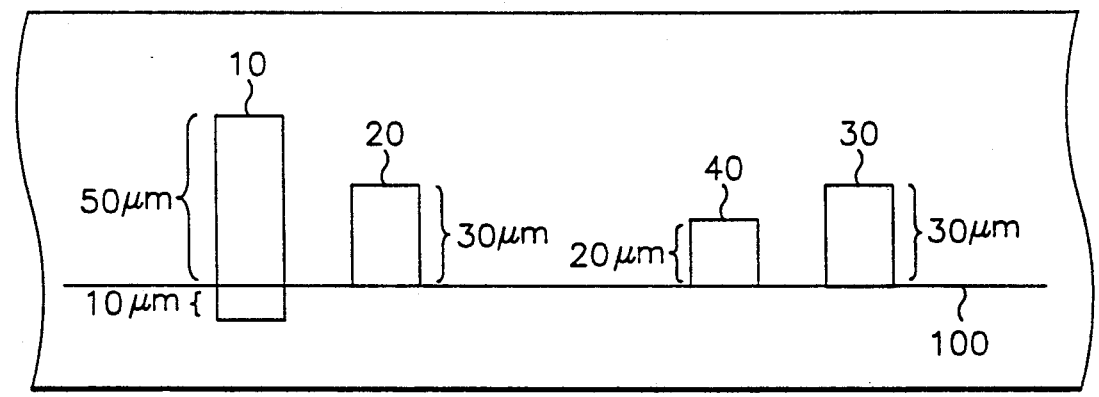
FIG. 4 is a plan view of head positions while serving for a VHS-VCR according to the present invention.

Referring to FIG. 4, the SP1 head 10 of which track width is reduced to 50 $\mu$m because the piezoelement attached thereto is lowered by 10 $\mu$m below the reference level 100 is mounted on the reference level 100. The EP2 head 20 with a track width of 30 $\mu$m is mounted on the reference level 100, so that the SP1 head 10 and the EP2 head 20 are formed in a pair. The SP2 head 40 with a track width of 20 $\mu$m is mounted on the reference level 100 and the EP1 head 30 with a track width of 30 $\mu$m is mounted on the reference level 100 due to the piezoelement being attached to the head, so that the SP2 head 40 and the EP1 head 30 are formed in a pair.

Since a track width of the standard play is 59 $\mu$m, 60 $\mu$m is used as reference, and since a track width of expended play is 19.3 $\mu$m, 30 $\mu$m is are commonly used. SP1 head 10 and EP2 head 20 are a pair of heads with different azimuth from each other. Therefore, when the head drum makes one rotation EP2, SP1, EP1, and SP1 tracks are recorded in turn, and when the head drum rotates in a 180 degrees arc, the pair of the SP1 and the EP2 heads 10, 20 and the other pair of the EP1 and the SP2 heads 30, 40 record video signals on their corresponding tracks. Hence the piezoelement 2 does not operate while the head drum serves for a digital VCR, because no voltage is applied to the above piezoelement through the switch SW1. Therefore, when the SP1 and the EP2 heads 10, 20 record video signals on the tape as shown in FIG. 3, the EP2 head 20 records the video signals on the tape with a track width of 30 $\mu$m. However, the recorded video signals will be deleted except for the video signals recorded on the tape area where the SP1 head 10 is dislocated by 10 $\mu$m relative to the EP2 head 20.

The SP1 head 10 records the video signals on the tape with a track width of 60 $\mu$m. However, only a track width of 29 $\mu$m remains on the tape, the rest being deleted by means of the EP1 head 30 and the SP2 head 40. Also, the SP2 head 40 and EP1 head 30 record the video signals with the track width of about 20 $\mu$m and 9 $\mu$m on the tape in the same method.

However, hence the piezoelement 2 operates while the head drum serves for a VHS-VCR, because voltage is applied to the above piezoelement 2 through the switch SW1. Therefore, the piezoelement 2 is contracted by means of the its characteristics, and thus the SP1 head 10 is lowered by 20 $\mu$m and the EP1 head 30 is lowered by 10 $\mu$m while the head drum serves for a VHS-VCR, as shown in FIG. 4. When two tracks are recorded on the tape while the head drum rotates in a 180 degree arc in a digital VCR, recording frequency can be reduced by $\frac{1}{2}$. For example, when a video signal with 8 bits sampled at 10 MHz is recorded on the video tape, its data processing bit rate will be 80 Mbps. In practice, this data processing bit rate is so high that the recording of video signals will be restricted according to the reactance component of the rotary transformer. However, when two tracks are recorded on the tape with two heads, it becomes 40 Mbps and recording is possible. Furthermore, if the data is compressed by ¼, only 5 Mbps is required per channel, thus making recording possible with an existing VHS deck.

As described in the foregoing, this invention has an advantage of implementing a video magnetic head for a joint use of a VHS-VCR and a digital VCR by using a piezoelement.

While the invention has been particularly shown and described with reference to a preferred embodiment, it will be understood by those skilled in the art that modifications in detail may be made without departing from the spirit and scope of the invention.

What is claimed is:

1. A head assembly for a video cassette recorder, said head assembly comprising:
    a head drum;
    a first standard play channel head, a second extended play channel head, a first extended play channel head, and a second standard play channel head sequentially arranged as a double azimuth four-head about a surface of said head drum;
    a piezoelement being disposed between said head drum and both the first standard play channel head and the first extended play channel head; and
    switching means for moving the first standard play channel head and the first extended play channel head into first positions for use when the video cassette recorder is in a VHS mode by applying a control voltage to said piezoelement, and for moving the first standard play channel head and the first extended play channel head into second positions for use when the video cassette recorder is in a digital mode by removing the control voltage.

2. The head assembly of claim 1, further comprised of said piezoelement moving said first standard play channel head and said first extended play channel head relative to a reference defined by said second extended play channel head and said second standard play channel head.

3. The head assembly of claim 2, wherein application of said control voltage to said piezoelement alters tracking paths of said first standard play channel head and said first extended play channel head.

4. The head assembly of claim 3, wherein said second standard play channel head and said second extended play channel head have fixed tracking paths.

5. The head assembly of claim 1, further comprised of said piezoelement being disposed to:
    enable signals recorded by said second extended play channel head to be partially deleted by said first standard play channel head when said switching means is in a first mode; and
    enable signals recorded by said first standard play channel head to be partially deleted by said first extended play channel head and said second standard play channel head when said switching means is in said first mode.

6. The head assembly of claim 5, wherein application of said control voltage to said piezoelement alters tracking paths of said first standard play channel head and said first extended play channel head.

7. The head assembly of claim 6, wherein said second standard play channel head and said second extended play channel head have fixed tracking paths.

8. The head assembly of claim 1, wherein application of said control voltage to said piezoelement alters tracking paths of said first standard play channel head and said first extended play channel head.

9. The head assembly of claim 8, wherein said second standard play channel head and said second extended play channel head have fixed tracking paths.

10. The head assembly of claim 1, wherein said second standard play channel head and said second extended play channel head have fixed tracking paths.

11. A recording head assembly for a video cassette tape recorder, comprising:
    a head drum having a head drum base;
    a first standard play channel head being movably positioned at a first position on the head drum base;
    a first extended play channel head being movably positioned at a second position on the head drum base;
    a second standard play channel head being fixedly positioned at a third position on the head drum base; and
    means comprising a piezoelectric element disposed between said head drum and both of said first standard play channel head and said first extended play channel head, for shifting tracking paths of said first standard play channel head and said first extended play channel head between a digital mode tracking position corresponding to use in a digital mode and a VHS mode tracking position corresponding to use in the VHS mode, by moving said first standard play channel head and said first extended play channel head to tracks on the surface of the head drum corresponding to the digital and VHS modes.

12. The head assembly of claim 11, further comprised of:
    said first standard play channel head having a first tracking width of 6 t micrometers and being shiftable by said shifting means between the digital tracking position with a lower boundary t micrometers above a reference line and the VHS tracking position with said lower boundary t micrometers below said reference line; and
    said first extended play channel head having a second tracking width of 3 t micrometers and being shifted between the digital tracking position having a lower boundary t micrometers above said reference line and the VHS tracking position with said lower boundary positioned at said reference line, wherein t is a positive real number.

13. The head assembly of claim 11, further comprised of:
    said second standard play channel head having a tracking width of 2 t and a fixed tracking path with a lower bondary at said reference line; and
    said second extended play channel head having a tracking width of 3 t and a fixed tracking path with a lower boundary at said reference line, wherein t is a positive real number.

14. The head assembly of claim 13, further comprising:
    switching means for causing said shifting means to shift said first standard play channel head between said first and second tracking positions, and to shift said first extended play channel between said first and second tracking positions.

15. A video cassette recorder head assembly comprising:
    a head drum;
    a movable standard play head positioned at a digital tracking position for tracking a digital track on a surface of the head drum;

a piezoelectric element disposed between said head drum and the movable standard play head; and switching means coupled to said piezoelectric element for controlling application of a control voltage to said piezoelectric element to move said movable standard play head from said digital tracking position and along the surface of the head drum to a VHS tracking position for tracking a VHS track.

16. The video cassette recorder head assembly of claim 15 wherein, in response to the control voltage, the switching means moves the movable head relative to a predetermined reference position.

17. A video cassette recorder head assembly comprising:
- a head drum;
- a plurality of heads mounted on a surface of the head drum, said plurality of heads comprising a movable standard play head, a fixed standard play head, a movable extended play head and a fixed extended play head;
- a piezoelectric element disposed between said head drum and both of the movable heads; and
- switching means coupled to said piezoelectric element for concurrently moving, between a digital tracking position corresponding to use with a digital video cassette recorder and a VHS tracking position corresponding to use with a VHS video recorder, said movable heads along the surface of the drum by applying a voltage to said piezoelectric element.

18. A method for use in a video cassette recorder head assembly, comprising the steps of:
- positioning a piezoelectric element between a head drum and both of a first standard play channel head and a first extended play channel head;
- rotating said head drum;
- positioning said first standard play channel head and said first extended play channel head at first positions for reading from and recording to a digital video track on a recording medium being rotated by the head drum, when a piezoelectric element is not activated; and
- positioning the first standard play channel head and said first extended play channel head at second positions for reading from and reading to a VHS video track on the recording medium being rotated by the head drum, when the piezoelectric element is activated by a voltage.

19. The method of claim 18 wherein the positioning steps comprise moving the first standard play channel head relative to a predetermined reference position.

* * * * *

UNITED STATES PATENT AND TRADEMARK OFFICE
CERTIFICATE OF CORRECTION

PATENT NO. : 5,255,140
DATED : Oct. 19, 1993
INVENTOR(S) : Jong-Kyoung Yoon

It is certified that error appears in the above-indentified patent and that said Letters Patent is hereby corrected as shown below:

On title page, item [30]

IN THE FOREIGN APPLICATION PRIORITY DATA

Change (Date) "Dec. 29, 1990" to --Dec. 29, 1989--;

Change (Patent No.) "1989-10073" to --1989-20073--.

IN THE CLAIMS

Claim 12, Column 4, Line 41, change "shifted" to --shiftable--;

Claim 17, Column 6, Line 2, insert --cassette-- before "recorder".

Signed and Sealed this

Twelfth Day of April, 1994

Attest:

BRUCE LEHMAN

Attesting Officer    Commissioner of Patents and Trademarks